Aug. 27, 1929.   H. I. MORRIS   1,726,497
APPARATUS FOR FABRICATING MATERIALS
Original Filed April 10, 1924   2 Sheets-Sheet 1
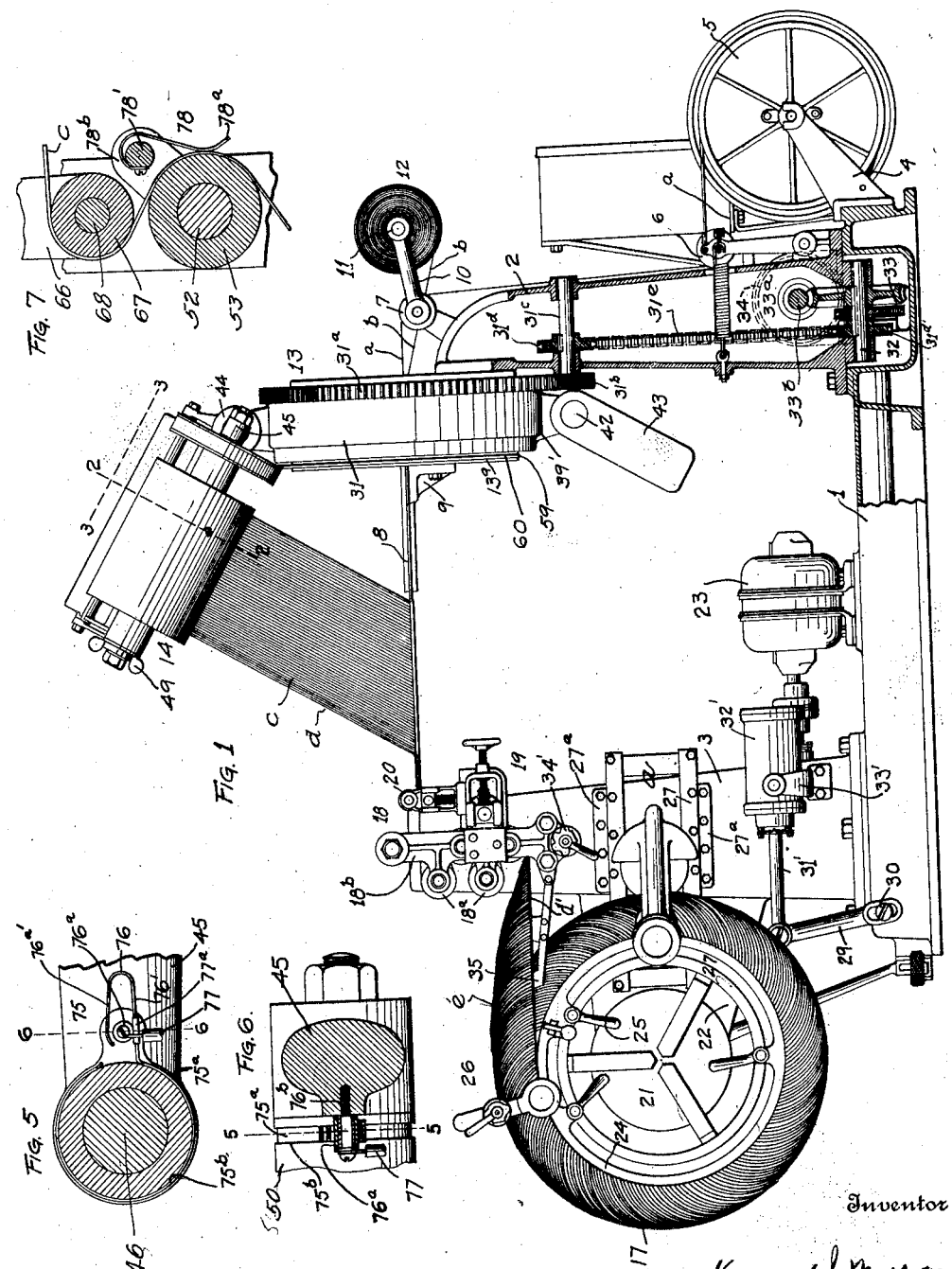
Inventor
Howard I. Morris
By
F. B. Pitts
Attorney

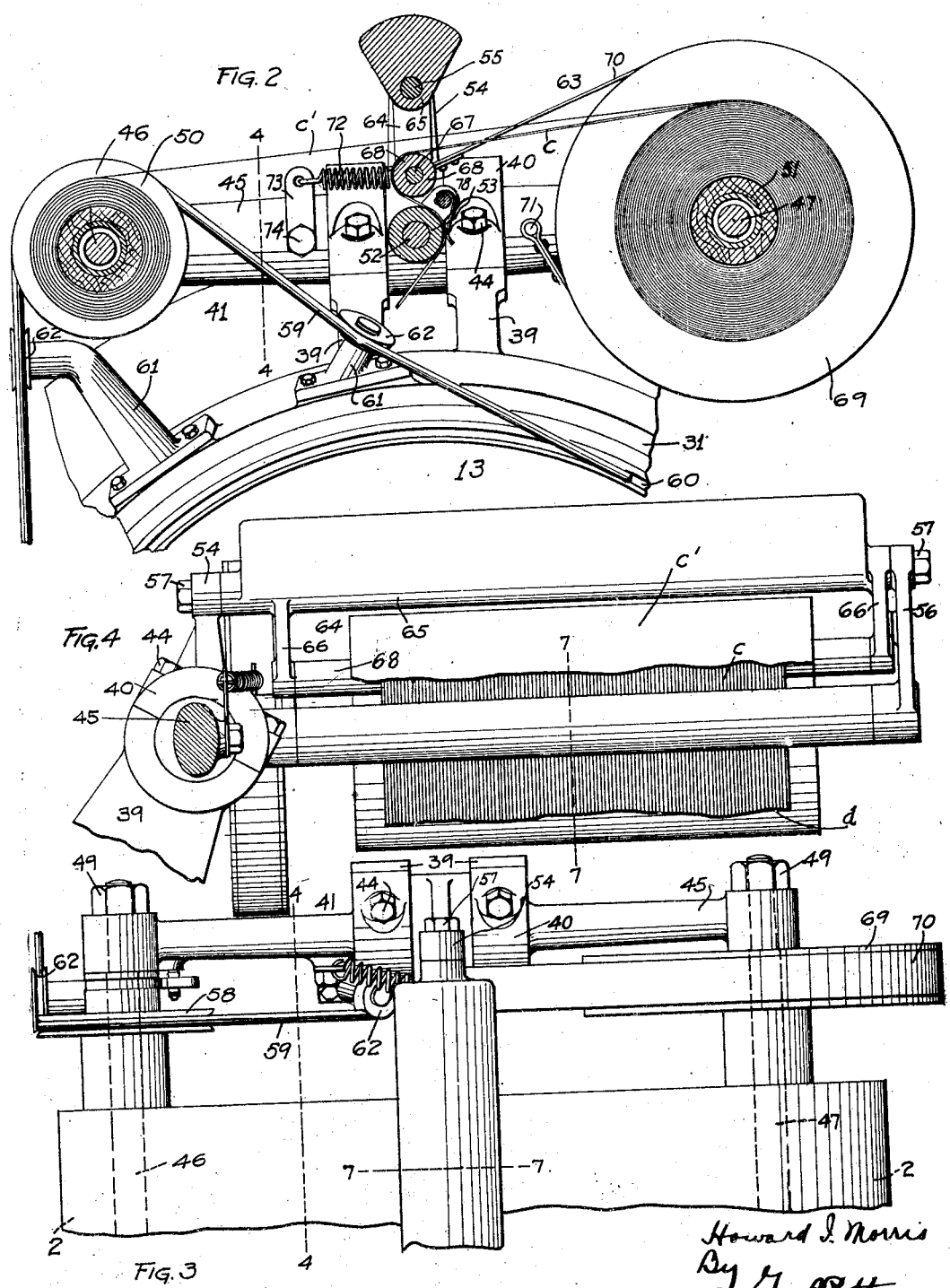

Patented Aug. 27, 1929.

1,726,497

UNITED STATES PATENT OFFICE.

HOWARD I. MORRIS, OF LAKEWOOD, OHIO, ASSIGNOR TO THE CORD TIRE MACHINE COMPANY, OF CLEVELAND, OHIO, A CORPORATION OF ARIZONA.

APPARATUS FOR FABRICATING MATERIALS.

Original application filed April 10, 1924, Serial No. 705,654. Divided and this application filed September 6, 1924. Serial No. 736,348.

This invention relates to an apparatus for fabricating materials, more particularly apparatus for making a continuous composite web of material adapted for use in the manufacture of tire carcasses.

One object of the invention is to provide an apparatus of this character of simple construction capable of delivering certain of the materials in a substantially uniform manner.

Another object of the invention is to provide an improved feeding means for one of the materials of the composite web capable of controlling its unwinding off the roll from which it is supplied, whereby it is delivered under uniform tension.

Another object of the invention is to provide an improved material delivery mechanism in which a retarding means is acted upon by the material as it unwinds from its supply roll, whereby the tension of the material during feeding is controlled substantially uniformly.

Another object of the invention is to provide an improved material delivery apparatus having provision for stopping the driving means in the event the material gives out or feeding is interrupted.

Other objects of the invention will be apparent to those skilled in the art to which my invention relates from the following description taken in connection with the accompanying drawings, wherein Fig. 1 is a side view of an apparatus embodying my invention.

Fig. 2 is a section on the line 2—2 of Fig. 1, a portion of the shuttle and the driving means for the liner roll being shown in elevation.

Fig. 3 is a plan view of the parts shown in Fig. 2; this figure also being a view on the line 3—3 of Fig. 1.

Fig. 4 is a section on the line 4—4 of Figs. 2 and 3, the liner roll driving means being omitted.

Fig. 5 is a fragmentary section on the line 5—5 of Fig. 6 showing the limiting means which operate when the liner fails to wind on its roll.

Fig. 6 is a section on the line 6—6 of Fig. 5.

Fig. 7 is a fragmentary section on the line 7—7 of Figs. 3 and 4.

I have, for illustrative purposes, shown my invention as applied to a machine for making tire carcasses wherein the materials of which the carcass is made, are continuously fabricated into a web and the latter is convolutely wound on a core to provide the carcass with the desired number of plies of material. This machine, a portion of which is shown in Fig. 1 of the accompanying drawings, forms the subject material of my co-pending application, Serial No. 705,654, April 10, 1924, of which this application is a division.

Referring to Fig. 1, 1 indicates a base of any desired construction and supporting standards 2, 3. 4 indicates brackets (only one being shown) supporting reels 5 on which are wound bead strips $a$ running around guide rolls 6 and 7 which position them at the opposite sides of a platen 8. The platen 8 is supported by a bracket 9, which forms a part of or is connected to the standard 2.

10 indicates an arm supported on the shaft for the guide rolls 7. The arm 10 supports a shaft 11 on which are positioned webs 12 of material $b$ that is guided to the opposite sides of the platen 8 for association with the bead strips $a$.

13 indicates a shuttle rotatively mounted on the standard 2 and carrying a material supply means, indicated as an entirety at 14. The shuttle 13 comprises a ring member 31 mounted to rotate on suitable bearings supported by the standard 2. The ring member 31 is provided with a ring gear $31^a$, with which meshes a driven pinion $31^b$ fixed to a shaft $31^c$. The shaft is mounted in suitable bearings in the walls of the standard 2, and carries a sprocket $31^d$ around which and a sprocket $31^{d'}$ a chain $31^e$ runs. The sprocket $31^{d'}$ is fixed to a shaft 32; the shaft 32 carries a worm gear 33 with which meshes a worm $33^a$. The worm $33^a$ is fixed to a shaft $33^b$ driven by a motor 34.

39, 39′ indicate pairs of spaced lugs preferably integrally formed on the outer surface of the ring member 31 at diametrically opposite sides thereof, the ends of the lugs co-operating with caps 40 to form bearings, one bearing forming a support for a frame 41 about to be described and the other bearing forming a support for a shaft 42 carrying a weight 43, which counter-balances the frame 41 and parts carried thereby.

The caps 40 are held in position by suitable cap screws 44, which, when tightened, hold the frame 41 and shaft 42 at the desired positions with the weight 43 at any determined angle relative to the axis of the shuttle ring member 31. The frame 41 comprises a cross bar 45 having transverse openings formed in its opposite ends to receive the corresponding ends, of shafts 46, 47, the ends of these shafts being threaded to receive nuts 49, by which they are secured in the openings and in fixed relation to the bar 45. The shafts 46, 47, are adapted to rotatably support spools 50, 51, respectively, to be later referred to. Intermediate the ends of the cross bar 45 is a boss (not shown), preferably disposed between the lugs 39. The boss is hollowed out to form a bearing for one end of a shaft 52, carrying a guide roller 53 to which reference will later be made. 54 indicates a bracket or arm, preferably formed integrally with the bar 45, and formed with an opening to receive one end of a rod 55. The opposite end of the rod 55 carries a supporting member 56 (see Fig. 4), in which is formed an opening aligned with the opening in the boss just referred to and forming the bearing for the outer end of the shaft 55. The ends of the rod 55 are screw threaded to receive nuts 57, by means of which the rod is secured to the arm 54, and the supporting member 56 is secured to the rod. To support the supporting member in spaced relation to the arm 54, the rod 55 is reduced near its opposite ends to form shoulders, which bear against the inner faces of the arm 54 and member 56. The spool 51 is adapted to support the web of tire material which is supplied by the shuttle to and associated with the bead strands $a$ and embedding strips $b$, being unwound from the spool 51 as the shuttle rotates, such material comprising a plurality of cords $c$ arranged substantially parallel to each other, or, by preference, a plurality of parallel arranged cords $c$ embedded in sheet rubber $d$; whereas the spool 50 is adapted to have wound on it the liner material $c'$ (which is wound in with the sheet rubber $d$ and cords $c$ for well known reasons), for which purpose the inner end of the spool 50 is provided with a grooved pulley 58, so that a band or belt 59, engaging a groove 60, formed in the supporting portion of the standard 2 on which the shuttle ring member 31 rotates, may rotate the spool 50, as the ring member rotates, and thus cause the liner material $c'$ to wind thereon. 61, 61, indicate arms secured to the ring member 31 and provided with suitable stud shafts on which guide rollers 62 are mounted to guide the band 59 into alignment with the pulley 58 and groove 60.

63 indicates as an entirety an automatically operating mechanism for controlling the paying out or supply of the web of cords or web of cords and sheet rubber, so that the tension on the web will be substantially uniform at all times. Of this mechanism, 64 indicates a frame swingably mounted on the rod 55 between the arm 54 and supporting member 56. The frame 64 preferably comprises a sleeve 65, having depending arms 66, connected by a rod 67, loosely supporting a roller 68 to which reference will later be made. The upper wall of the sleeve 65 is preferably thickened to provide a counterbalance to off-set gravity on the frame 64 as it rotates with the shuttle frame 41. 69 indicates a brake wheel fixed to the inner end of the spool 51. 70 indicates a brake band wrapped around a portion of the wheel, one end of the brake band being fixed to a stud 71 projecting laterally from the inner side of the cross bar 45 and its opposite end being secured to the adjacent free end of the frame 64. 72 indicates a spring having one end fixed to the frame 41, preferably to a plate 73 fixed thereto by a bolt 74 and its other end connected to the frame 64 and normally tending to swing it in one direction about the rod 55. As shown in Fig. 2, the spring is disposed on that side of the frame 64 remote from the spool 51 and acts to swing the free end of the frame away therefrom, and as the brake band 70 is connected to the frame 64, such action will result in applying the brake to the wheel 69. A wound web of tire materials $c, d$, is placed on the spool 51, as shown in Fig. 2, and its end is led over and around the roller 68 and then over and around the guide roller 53, from which the web leads to the platen (see Fig. 1) for association with the strands $a$ and strips $b$ and fabrication of the composite web $e$. As the web of materials $c, d$, is drawn off of the spool 51, due to the revolving movement of the latter with the shuttle ring member 31, the tension of the web running around the rollers 68, 53, will tend to expand the spring 72 and hence relieve the tension of the brake band 70 on the brake wheel 69, thereby permitting the latter to rotate to pay out the web; following the relieving of the brake band and the increased paying out of the web, the tension of the web on the frame 64 will be decreased, the effect of which will be to permit the spring 72 to act on the frame 64 and through it on the brake band 70 to wrap it about the brake wheel 69 and thereby to stop the free rotation of the latter and undue paying out of the web. It will be understood that the parts just referred to are arranged to co-act so that the braking and releasing of the brake wheel incident to the increase and decrease of the tension of the web running around the roller 68 will result in controlling the rotation of the spool 51 to the end that the paying out of the web therefrom and the tension thereon at all times is substantially uniform. As a result of this arrangement and operation, the web is delivered to the platen uniformly and wound thereon and around the spaced bead strands $a$ and strips $b$ smoothly as the materials become associated.

18 indicates as an entirety a consolidating and feeding mechanism, preferably comprising a plurality of rolls $18^a$, certain of which are driven, rotatably mounted at their opposite ends in bearings provided on the standard 3 and a plate $18^b$ supported in spaced relation to the standard 3, and a pair of rolls 20 interposed between the rolls $18^a$ and the free end of the platen 8.

19 indicates devices for adjusting one of the rolls $18^a$ to increase the pressure thereof on the materials to complete the consolidation thereof.

The core 17 is removably mounted upon a chuck 21, which in turn is supported upon and driven by a shaft rotatably mounted in bearings in a housing 22, which extends outwardly, through suitable driving connections (not shown) by a motor 23 mounted on the base 1.

24 indicates bead rings (only one being shown) arranged to be clamped by devices 25 to the opposite sides of the core 17.

26 indicates as an entirety bead rolling down devices preferably mounted upon an arm (not shown) pivoted at its inner end to the standard 3. The rolling down devices include rollers, which engage the bead portion $d'$ of the web (see Fig. 1) to press them against the sides of the core 17. The construction of these devices and the mounting thereof forms the subject matter of a separate co-pending application, Ser. No. 750,127.

27 indicates as an entirety mechanism for rolling down the body portion of the web $e$ as it is wound on the core 17. The rolling down mechanism 27 is preferably mounted to slide in guides $27^a$ carried by the standard 3, whereby it may move substantially in a radial direction toward and from the core 17. The rolling down mechanism 27 is connected to the free end of a lever 29, which is slidably and pivotally connected at its lower end to the base 1, as shown at 30. Intermediate its ends, the lever 29 is connected to a rod 31' which carries at its inner end a piston mounted in a cylinder 32'. The cylinder 32' is provided with valved controlled ports for the admission of compressed air or other medium, whereby the rod 31' may be operated to swing the lever 29 and thus move the rolling down mechanism 27 into and out of operating position. The cylinder 32' is preferably trunnioned between the standard 3 and a bracket 33, so that it may accommodate itself to the position of the lever 29 as the latter is operated.

34 indicates a valve mechanism for controlling the compressed air to the bead rolling down devices 26, the body rolling down mechanism 27 and cylinder 32'.

The body rolling down mechanism 27 forms the subject matter of a separate co-pending application, Ser. No. 736,349, Patent No. 1,677,401, July 17, 1928, for which reason further description thereof will not be necessary.

35 indicates as an entirety a guide shoe disposed between the consolidating mechanism 18 and the core 17 and arranged to guide the web $e$ to the core 17, so that the bead portion $d'$ thereof may engage the sides of the core adjacent to the bead rings simultaneously with or prior to the engagement of the body portion of the web with the core.

75 indicates as an entirety a limit switch arranged to open the circuit to the motor 34 in the event the liner $c'$ while passing from the spool 51 to the spool 50 sticks to the cords $c$ or rubber sheet $d$. The limit switch 75 preferably operates, as disclosed in my aforesaid application, to close a supplemental circuit having connected in it a relay or electro-magnet (not shown herein) which in turn operates to open the circuit to the motor 34; but it could be modified for connection in the motor circuit so as to normally maintain the circuit closed and to open such circuit in the event the liner sticks as just set forth. Of the limit switch 75, $75^a$ indicates a strip formed from resilient metal into a circular section, which fits and frictionally engages a groove $75^b$ formed in the hub of the liner roll 50, and a U-shaped arm 76, which straddles a contact $76^a$ mounted on, but insulated from a bolt $76^b$ which is supported in the frame member 45; one leg 76' of the arm 76 constituting a lead which is grounded through the machine and the other leg $76^{a'}$, being adapted to engage the contact $76^a$ to which is connected the lead 77. $77^a$ indicates a section of insulating material mounted on the leg 76' and positioned to prevent contact between the leg and the contact $76^a$. In operation, the liner $c'$ is wound on the roll 50, which is rotated counter-clockwise as shown in Figs. 2, 3 and 5, such rotation tending to rotate the circular section $75^b$ of the strip $75^a$ due to the friction between such section and the spool hub, but due to the engagement of the leg 76' with the contact $76^a$ as this rotation takes place, the latter will hold the arm 76 stationary (while the hub continues to rotate) with the leg $76^a$ spaced from the contact $76^a$, as shown in Fig. 5. If however, the liner sticks to the cords $c$ and rubber $d$, as the latter feeds through its guide rolls, the liner $c'$ will cause a slight backward rotation of its roll 50, which in turn will move the arm 76 in the opposite direction far enough to effect engagement between the leg $76^{a'}$ and contact 76a, thereby completing the circuit through the coil of the relay (already referred to) and effecting an opening of the circuit to the motor 34 and stoppage of the machine.

78 indicates as an entirety a limit switch arranged to open the circuit to the motor 34 in the event the supply of the web of cords c and rubber d gives out. This switch, like the switch 75 preferably operates, as disclosed in my aforesaid application, to close a supplemental circuit having connected in it a relay or electro-magnet (not shown) which in turn operates a switch to open the circuit to the motor 34; but this switch could also be modified for connection in the motor circuit so as to normally maintain it closed and to open such circuit in the event the supply of material ceases. Of the limit switch 78, 78a indicates a spring arm connected to a rod 78' which constitutes or has connected to it a lead (not shown) suitably insulated from the machine. The rod 78 is supported at its opposite ends by a pair of lugs 78b (one being shown in Fig. 7) carried by the bar 45 and member 56, the arm 78a being preferably disposed midway between the ends of the rod 78' and in position to normally engage with the roller 53. As shown, the arm 78a is held out of such engagement by the web of cords c and rubber d, as the web runs over the roll 53. The roll 53 constitutes the lead which is grounded through the machine. In operation, if the supply of the web gives out, the arm 78a will engage the roll 53 and thereby close the circuit through the coil of the relay (already referred to) and stop the machine, as already described.

To those skilled in the art to which my invention relates many changes in construction and widely different embodiment and applications of my invention will suggest themselves without departing from the spirit and scope thereof. My disclosures and the description herein are purely illustrative and are not intended to be in any sense limiting.

What I claim is this:

1. In apparatus of the class described, the combination of a support, a platen thereon, a shuttle mounted to rotate on said support around said platen, a spool on said shuttle having a ribbon of material on it, whereby the ribbon of material is helically wound around said platen, a pair of rollers mounted for relative movement on said shuttle around which the ribbon of material is guided, and means connected to one of said rollers and affected by the feeding of material therearound to control the supply from said spool.

2. In apparatus of the class described, the combination of a support, a platen thereon, a shuttle mounted to rotate on said support around said platen, a spool on said shuttle having a ribbon of material on it, whereby the ribbon of material is helically wound around said platen, a pair of rollers, around which the ribbon of material is guided, mounted on said shuttle, one roll being mounted on a stationary shaft and the other roller being arranged between the stationary roller and said spool and mounted to move bodily relative to said stationary roller and operated in one direction by the material running around it, an operative connection between the support for said movable roller and said spool, and resilient means normally acting on said roller support in opposition to the action of the material thereon, whereby the supply of the material is automatically controlled.

3. In apparatus of the class described, the combination of a support, a platen thereon, a shuttle mounted to rotate on said support around said platen, a spool on said shuttle having a ribbon of material on it, whereby the ribbon of material is helically wound around said platen, a pair of rollers, around which the ribbon of material is guided, mounted on said shuttle, one roller being mounted on a stationary shaft and the other roller being arranged between said stationary roller and said spool and mounted to move bodily relative to said stationary roller and operated in one direction by the material running around it, an operative connection between the support for said movable roller and said spool, resilient means normally acting on said roller support in opposition to the action of the material thereon, whereby the supply of the material is automatically controlled, and means for counterbalancing the movable roller.

4. In apparatus of the class described, the combination of a support, a platen thereon, a shuttle mounted to rotate on said support around said platen, a spool on said shuttle having a ribbon of material on it, whereby the ribbon of material is helically wound around said platen, a roller, around which the ribbon of material is guided, mounted for swinging movement on said shuttle, means for operatively connecting said spool and the support for said roller, and resilient means normally acting on said roller in opposition to the action of the material on said roller to affect said connections and through them to control the supply of material from said spool.

5. In apparatus of the class described, the combination of a support, a platen thereon, a shuttle mounted to rotate on said support around said platen, a shaft on said shuttle adapted to carry a spool provided with a ribbon of material, means for rotating said shuttle, whereby the ribbon of material is helically wound around said platen, a movable guide roller on said shuttle over which the ribbon of material runs as it is delivered to said platen, a brake connected to said guide roller and acting on the hub of the spool for the ribbon of material, and a spring acting through said guide roller to apply the brake to the spool hub in opposition to the tension of the material running over said guide roller, whereby the supply of the material is automatically controlled.

6. In apparatus of the class described, the combination of a support, a platen thereon, a shuttle mounted to rotate on said support around said platen, a pair of shafts on said shuttle adapted to carry a pair of spools, respectively, one spool being adapted to have wound on it a liner and the other spool provided with a ribbon of material and the liner which unwinds therefrom, means for rotating said shuttle, whereby the ribbon of material is helically wound around the platen, means engaging the spool for the liner and said support for rotating said spool as the shuttle rotates, and means automatically controlling the unwinding of ribbon material from its supply spool.

7. In apparatus of the class described, the combination of a support, a platen thereon, a shuttle mounted to rotate on said support around said platen, a shaft on said shuttle adapted to carry a spool provided with a ribbon of material, means for rotating said shuttle, whereby the ribbon of material is helically wound around the platen, and means automatically controlling the unwinding of the ribbon of material from its supply spool, said means including a member operated upon in one direction by the ribbon of material as it unwinds and a spring normally acting on said member in opposition to the material, whereby the tension of the material is automatically controlled to provide uniform supply of the material.

8. In apparatus of the class described, the combination of a support, a platen thereon, a shuttle mounted to rotate on said support around said platen, a shaft on said shuttle adapted to carry a spool provided with a ribbon of material, means for rotating said shuttle, whereby the ribbon of material is helically wound around the platen, as the shuttle rotates, a movable guide roller on said shuttle over which the ribbon of material runs after it is delivered to said platen, a brake connected to said guide roller and acting on the hub of the spool for the ribbon of material, and a spring acting through said guide roller to apply the brake to the spool hub in opposition to the tension of the material running over said guide roller.

9. In apparatus of the class described, the combination of a support, a platen mounted thereon, a shuttle rotatably mounted on said support, a material supply means on said shuttle, means for rotating said shuttle to wind the material thereon around said platen, a pair of relatively movable guide rollers on said shuttle around which the material runs, a brake engaging the material supply member and connected to the movable roller, and a spring acting on said movable roller in a direction opposite to the tension of the material as it unwinds from its supply means and in a direction to apply said brake.

10. In apparatus of the class described, the combination of a member on which material is to be wrapped, a member revoluble around said member and carrying a pair of spools one of which is a supply spool wound with a plurality of materials, means for effecting relative movement between said members, a connection between said first mentioned member and the other spool for rotating said spool to wind thereon one of the materials on said supply spool, and tensioning means acted upon by the other materials to automatically control the supply thereof for delivery to said first mentioned member.

In testimony whereof, I have hereunto subscribed my name.

HOWARD I. MORRIS.